United States Patent Office 2,769,823
Patented Nov. 6, 1956

2,769,823

PREPARATION OF 17α-HYDROXY-20-KETO-PREGNENES

William P. Schneider, Kalamazoo, and Arthur R. Hanze, Kalamazoo Township, Kalamazoo County, Mich., assignors to The Upjohn Company, Kalamazoo, Mich., a corporation of Michigan No Drawing. Application April 23, 1954,
Serial No. 425,315

20 Claims. (Cl. 260—397.45)

This invention relates to the production of steroids, and more particularly to the production of 17-hydroxy-20-keto-21-acyloxy steroids by the oxygenation of $\Delta^{17(20)}$-21-acyloxy steroids in an improved yield with osmium tetroxide and an amine oxide peroxide.

It is an object of the present invention to provide an improved process for producing a 17-hydroxy-20-keto-21-acyloxy steroid by the oxygenation of a $\Delta^{17(20)}$-21-acyloxy steroid with osmium tetroxide and an amine oxide peroxide. Another object is the provision of an improved process for the production of cortisone, hydrocortisone, 11-epihydrocortisone, and 17-hydroxy-11-desoxycorticosterone and their esters. A further object is to provide a process which gives an improved ultimate yield of 17-hydroxy-20-keto-21-acyloxy steroid. A further object is to provide a process which gives an improved yield of 17-hydroxy-20-keto-21-acyloxy steroid per unit of reaction time. A further object is to provide a process which gives an improved yield of the desired 17-hydroxy-20-keto-21-acyloxy steroid per unit of osmium tetroxide. Still another object is to provide an improved process for the production of 17α-hydroxy-20-keto-21-acetoxy steroids of the pregnane series. Other objects will be apparent to those skilled in the art to which this invention pertains.

The objects of the present invention are achieved by oxygenating a $\Delta^{17(20)}$-21-acyloxy steroid with osmium tetroxide and an amine oxide peroxide. Under these conditions a higher yield of 17α-hydroxy-20-keto-21-acyloxy steroid is obtained, a shorter reaction time is necessary to achieve complete reaction, the amount of osmium tetroxide necessary to achieve optimum results is lower, the incident of side reactions is lower, and purification of the reaction product is easier than heretofore possible with the reactions known in the art.

The use of osmium tetroxide to convert a double bonded compound into a glycol is a well known reaction. In this reaction, the osmium tetroxide adds to the double bond to form a cyclic osmate ester, which upon hydrolysis, usually with aqueous sodium sulfite, yields a glycol. This reaction has been applied to steroids in U. S. Patents 2,265,143; 2,275,790; 2,492,194; and 2,493,780 where side chain unsaturated pregnane steroids are oxygenated with usually an equimolar amount of osmium tetroxide, followed by hydrolysis with aqueous sodium sulfite, to produce a 17,20-dihydroxypregnane steroid. U. S. Patent 2,493,780 also discloses that hydrogen peroxide can be used with a catalytic amount of osmium tetroxide. Similar hydroxylation reactions involving a double bonded compound, hydrogen peroxide and a catalytic amount of a metal oxide, may be found in U. S. Patents 2,373,942; 2,402,566; 2,414,385; and 2,437,648.

The oxygenation of unsaturated steroids of the pregnane series with osmium tetroxide and certain oxidizing agents is also known in the art. Prins and Reichstein, Helv. Chim. Acta, 25, 300 (1942) report that oxidation of the cyclic osmate ester of a side chain unsaturated steroid with chloric acid gives a hydroxy-keto steroid as well as the glycol steroid produced when the osmate ester is hydrolyzed with aqueous sodium sulfite. Miescher and Schmidlin, Helv. Chim. Acta, 33, 1840 (1950) substituted hydrogen peroxide for the chloric acid as the oxidizing agent of the steroidal osmate ester and in U. S. Patent 2,668,816 disclosed that alkyl peroxides and peracids could be used also. This reaction, however, gives extremely poor yields per unit time, requiring from about 48 to 96 hours or more to reach a maximum yield of about 48 percent. Miescher and Schmidlin disclosed in U. S. Patent 2,662,854 that the reaction is catalyzed by light, but even so, the increase in the velocity of the reaction is slight. Their examples, for instance, show the reaction times ranging from twenty to 48 hours or more.

TABLE I

| | Oxidizing Agent | Ratio of Steroid to $OsO_4$ | Ratio of Product to By-product | Reaction Time (Hours) | Yield of Product |
|---|---|---|---|---|---|
| Prins and Reichstein | chloric acid | 1:1.5 | 0.45:1 | 72 | less than 25 percent. |
| Miescher and Schmidlin | $H_2O_2$, alkyl peroxides, peracids. | 14:1 | 1.8:1 | 20-80 | 48 percent. |
| This invention | amine oxide peroxides. | as high as 1250:1. | 5.4:1 | 0.1-8 | 65-75 percent. |

Table I illustrates the differences between the oxygenations of the prior art and the oxygenation of this invention. When following the process of this invention, the weight ratio of starting steroid to osmium tetroxide is much higher than that of the processes of the prior art, the ratio of product to by-product is higher, and the reaction time is much less. Moreover, the yield of hydroxy-keto-steroid is increased up to fifty percent or more over the best yield reported in the prior art. Whereas the reaction of a $\Delta^{17(20)}$-21-acyloxy steroid with osmium tetroxide and hydrogen peroxide is a sluggish reaction which requires at least twenty hours or more to reach completion, the reaction of a $\Delta^{17(20)}$-21-acyloxy steroid with osmium tetroxide and an amine oxide peroxide is normally substantially complete in less than one hour or sometimes in less than five minutes. Although a longer reaction time than one hour is sometimes needed, even so, the overall time rarely, if ever, will exceed eight hours. Thus, it will be seen that the reaction employing an amine oxide peroxide proceeds at a greatly accelerated rate, the desired 17-hydroxy-20-keto steroid being produced in the process of the present invention at a rate some 200 to 800 times or more greater than in the prior art processes.

When following the process of this invention, it is not necessary to employ light as a reaction catalyst, since the reaction proceeds with equal facility in complete darkness. It has been found, however, that the addition of pyridine or like aromatic tertiary-N-heterocyclic amine to the reaction mixture sometimes catalyzes the reaction. Although the addition of this pyridine or like aromatic-N-heterocyclic amine, e. g., collidine, picoline, lutidine, does not substantially effect the yield of desired product, the reaction rate can sometimes be accelerated in its presence. The addition of about one to five molar equivalents or so of pyridine, calculated on the starting steroid, is usually sufficient to obtain any catalytic effect.

The amine oxide peroxides employed in the process of this invention are prepared by the reaction of a tertiary amine with two molar equivalents of hydrogen peroxide or by the reaction of a tertiary amine oxide with one molar equivalent of hydrogen peroxide. It is sometimes advantageous to use more than the theoretical amount of hydrogen peroxide, the excess being removed during the purification of the amine peroxide. Sometimes, if the reaction is conducted in the presence of water, the amine oxide hydrate will be formed rather than the amine oxide peroxide. If this occurs, the amine oxide peroxide can be prepared under anhydrous conditions.

Amine oxide peroxides are a novel class of oxidizing agents. For the most part, they have a higher oxidation potential than the hydrogen peroxide from which they were prepared. For example, the half wave potential of hydrogen peroxide, determined on a Leeds and Northrup electro-chemograph with dropping mercury electrode ["Instrumental Methods of Analysis," Willard, et. al., D. Van Nostrand Co. (1951)] in tertiary butyl alcohol, is —1.92 volts whereas that of triethylamine oxide peroxide is —1.82 volts. This difference in half wave potential indicates that the voltage necessary to produce decomposition of the hydrogen peroxide is higher than with the triethylamine oxide peroxide and, conversely, that the oxidation potential of the triethylamine oxide peroxide is higher than that of hydrogen peroxide. Similar differences in oxidation potential are found between other amine oxide peroxides and hydrogen peroxide.

The amine oxide peroxides of the present invention are preferably non-aromatic, i. e., the molecule is devoid of an aromatic group of any kind. The non-aromatic tertiary amine oxide peroxides include the N-alkyl cycloalkylamines oxide peroxides, e. g., N-alkylmorpholine oxide peroxide, N-alkylpyrrolidine oxide peroxides, and N-alkylpiperidine oxide peroxides; the trialkylamine oxide peroxides, e. g., trimethylamine oxide peroxide, triethylamine oxide peroxide, methyldiethylamine oxide peroxide, ethyldimethylamine oxide peroxide, the alkanolamine oxide peroxides, e. g., dimethylethanolamine oxide peroxide, pyrrolidylethanol oxide peroxide, piperidylethanol oxide peroxide, etc. Of these amine oxide peroxides, triethylamine oxide peroxide and N-methylmorpholine oxide peroxide are especially advantageous.

The amine oxides from which amine oxide peroxides can be prepared are a well-known class of compounds, the preparations of which are described in the literature. In their preparation, hydrogen peroxide is frequently employed although peracetic, perbenzoic, persulfuric, or other peracid is sometimes used. Some amines, e. g., pyridine, are resistant to conversion to an oxide with hydrogen peroxide, thus necessitating the use of special conditions or peracids to produce the oxides thereof [Ochia, J. Org. Chem. 18, 534 (1953)]. If the amine oxide peroxide is prepared directly from the amine, it is sometimes advantageous to use the whole reaction mixture in the oxygenation of the steroid without isolation of the thus-produced amine oxide peroxide. If this procedure is employed, precaution should be taken that the reaction mixture is not contaminated with the starting amine, since the presence of some amines in the reaction mixture are detrimental to the oxygenation reaction. The presence of free amine can be avoided by allowing the reaction mixture resulting from the reaction of the amine with the hydrogen peroxide to stand for several days before using.

In carrying out the process of the invention, the starting steroid is advantageously dissolved in an inert organic solvent for example, tertiary butyl alcohol, diethyl ether, tetrahydrofuran, or the like, and the osmium tetroxide and the amine oxide peroxide mixed therein. Advantageously, though not necessarily, the osmium tetroxide is added after the addition of the amine oxide peroxide. Advantageously also, the osmium tetroxide and the amine oxide peroxide are added in solutions of the same solvent used as the vehicle used for the reaction.

The amount of osmium tetroxide employed in the reaction can be varied widely, for example, from 0.2 molar equivalent to 0.001 molar equivalent. Advantageously, however, not more than 0.05 molar equivalent is used. When the amount of osmium tetroxide employed is between 0.001 and 0.05 molar equivalents, it is possible to obtain high yields of desired product and to remove the residual osmium tetroxide with ease, e. g., by treating the reaction product with an osmium tetroxide precipitant, such as sodium sulfite, without heating or without mixing for a long period of time. In this way, a high yield of product of improved color and composition is obtained without substantial deacylation of the 21-acyloxy group.

The amount of amine oxide peroxide theoretically required to produce a 17-hydroxy-20-keto-21-acyloxy steroid is two moles for each mole of osmate ester formed in the reaction. It has been found, however, that in the process of this invention, more than the theoretical amount of amine oxide peroxide is necessary to obtain a complete reaction. For optimum results in the process of this invention, therefore, it is usually necessary to use amine oxide peroxide in excess of the theoretical amount. For example, optimum results are ordinarily obtained using between about 2.2 and about 2.75 equivalents of amine oxide peroxide, calculated on the starting steroid. When less amine oxide peroxide is used, the yield is impaired through incomplete reaction. Higher amounts of amine oxide peroxide than about 2.75 molar equivalents may be used, in many cases without impairing the yield, but higher amounts are usually undesirable, especially where a 3-keto-$\Delta^{4,17(20)}$-21-acyloxy steroid is to be oxygenated while keeping the $\Delta^4$-3-keto group intact. It has been observed with such steroids that large excesses of amine oxide peroxide tend to degrade the A ring, thus causing a secondary reaction which impairs the overall yield of desired $\Delta^4$-3,20-diketo-17$\alpha$-hydroxy-21-acyloxy steroid.

If desired, the amine oxide peroxide can be added slowly to the steroid and osmium tetroxide mixture, e. g., over a period of several minutes to several hours. Sometimes the reaction proceeds somewhat more favorably under these conditions. However, in most cases, the amine oxide peroxide can be added all at once at the beginning of the reaction, with no adverse effect upon the yield of desired product. The course of the oxygenation reaction can be readily determined by the titration of aliquot portions for residual amine oxide peroxide. Ordinarily, the presence of small amounts of water in the reaction mixture does not adversely effect the yield of desired product. However, to insure optimum yields of desired product, the reaction advantageously may be performed under substantially anhydrous conditions, e. g., in dry tertiary butyl alcohol, or like solvent. Since water is produced in the reaction, the reaction normally is not maintained anhydrous, although the addition of an efficient inert drying agent or other suitable means of removing the water of the reaction can sometimes be employed with advantage.

The reaction temperature normally is between about fifteen and about thirty degrees centigrade although higher or lower temperatures are operable, e. g., between about minus ten and about plus seventy degrees centigrade. For convenience, room temperature is ordinarily employed. Optimum yields of desired product are usually obtained at room temperature also. However, when a particularly small proportion of osmium tetroxine is employed in the reaction, e. g., below about 0.002 molar equivalent, calculated on the starting steroid, a reaction temperature somewhat above room temperature may be desirable.

In place of the solvents noted above, there may be used any inert solvent which is a solvent for the reagents. Suitable solvents include diethylether, dioxane, isopropylalcohol, tetrahydrofuran, tertiary butyl alcohol, tertiary amyl alcohol, ethanol and methanol. Advantageously, the solvent is preferably one boiling low enough so that it can be removed from the reaction product by distillation under reduced pressure at or below room temperature.

The $\Delta^{17(20)}$-21-acyloxy steroids, preferably of the pregnane series, which can be oxygenated to produce the corresponding 17α-hydroxy-20-keto-21-acyloxy steroids by the process of the invention may be represented by the following formula

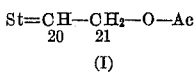

(I)

wherein Ac represents the acyl radical of an organic carboxylic acid, preferably containing from one to eight carbon atoms, inclusive, especially the acyl radical of a lower-aliphatic carboxylic acid, particularly acetic acid, and wherein St represents a cyclopentanopolyhydrophenanthrene radical attached to the above-identified side chain by a double bond at carbon atom 17. Advantageously the cyclopentanopolyhydrophenanthrene radical and the acyl radical are both free of substituents or groupings which are affected by osmium tetroxide under the conditions of the process. A preferred type of starting steroid is either saturated or contains only $\Delta^4$ unsaturation coupled with a 3-keto group. Similarly it is of advantage if the preferred starting steroids contain only saturated acyl groups because double bonds, whether in the nucleus or in the acyl radical, sometimes are also affected by the osmium tetroxide and amine oxide peroxide. In addition the nucleus of the starting steroid can advantageously have a hydroxy, keto, acyloxy, hydrocarbonoxy, benzyloxy, halogen, or oxido group or groups at the 3, 6, 11 and 12 or other positions of the nucleus and the angular methyl groups attached to the 10 and 13 carbon atoms each or both may be present or absent. The process of the invention, however, being an improvement in prior processes for oxygenating $\Delta^{17(20)}$-21-acyloxy steroids to 17-hydroxy-20-keto-21-acyloxy steroids is, in its broader aspects, broadly applicable to oxygenation of any $\Delta^{17(20)}$-21-acyloxy steroid to 17-hydroxy-20-keto steroids. In its more particular aspects, however, the process of the invention is particularly adapted to the oxidation of 3-oxygenated-$\Delta^{17(20)}$-21-acyloxy pregnane series steroids, e. g., 3α- and 3β-hydroxy-21-acetoxy-17(20)-pregnene, 3α,21- and 3β,21-diacetoxy-17(20)-pregnene, 3α,11β- and 3β,11β-dihydroxy-21-acetoxy-17(20)-pregnene, 21-acetoxy-17(20)-pregnene-3-one, 21-acetoxy-17(20)-pregnene-3,11-dione, 11β - hydroxy - 21-acetoxy-4,17(20)-pregnadiene-3-one, 11α - hydroxy - 21-acetoxy-4,17(20)-pregnadiene-3-one, 21 - acetoxy - 4,17-(20)-pregnadiene-3,11-dione, 21-acetoxy-4,9(11),17(20)-pregnatriene-3-one, and other 21-acyloxy esters of the above-named compounds and the like wherein the 21-acyloxy group is, for example, formyloxy, acetoxy, propionyloxy, butyryloxy, dimethylacetoxy, trimethylacetoxy, valeryloxy, hexanoyloxy, octanoyloxy, β-cyclopentylpropionyloxy, diethylacetoxy, benzoxy, phenylacetoxy, phenylpropionyloxy, succinoyloxy, phthaloyloxy, or the like. Of these starting steroids, especially preferred are steroids represented by the following formula:

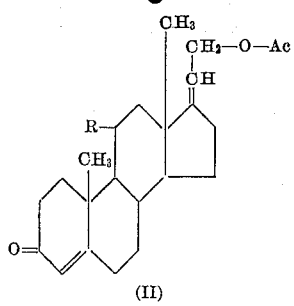

(II)

wherein Ac is the acyl radical of an organic carboxylic acid, preferably a lower-aliphatic acid, especially acetic acid, and wherein R is a hydrogen atom, an α-hydroxy group, a β-hydroxy group or ketonic oxygen (=O), since these steroids can be readily converted, utilizing the process of the present invention into the physiologically active cortical hormones cortisone (Kendall's Compound E) and hydrocortisone (Kendall's Compound F). For example, reacting 21-acetoxy-4,17(20)-pregnadiene-3,11-dione with osmium tetroxide and an amine oxide peroxide according to the method of the present invention produces cortisone acetate. Similarly, 11β-hydroxy-21-acetoxy-4,17(20)-pregnadiene-3-one is converted in the same manner to 11β,17α-dihydroxy-21-acetoxy - 4 - pregnene-3,20-dione (hydrocortisone acetate). 11α-hydroxy-21-acetoxy-4,17(20)-pregnadiene-3-one is similarly converted to 11α,17α-dihydroxy-21-acetoxy-4-pregnene-3,20-dione which is readily oxidized with chromic acid to cortisone acetate (U. S. Patent 2,602,769 of Murray and Peterson, issued July 8, 1952) and 21-acetoxy-4,17(20)-pregnadiene-3-one is similarly converted to the physiologically active 17α-hydroxy-21-acetoxy-4-pregnene-3,20-dione. Since most physiologically active steroids possess a 17α-hydroxy-20-keto-21-hydroxy or acyloxy grouping, the process of the present invention provides an effective method of converting $\Delta^{17(20)}$-21-acyloxy steroids into steroids possessing at least part of the requisite structure necessary to produce a physiologically active steroid. Since many synthetic methods are known in the art for the introduction of a $\Delta^4$-3-keto group and the introduction of an 11-oxygen atom into the steroid nucleus and for the removal of inactivating groups from the nucleus, other steroids besides those represented by Formula II are readily convertible, via the process of the present invention, into physiologically active steroids.

The starting $\Delta^{17(20)}$-21-acyloxy steroids for the process of the invention can be produced in several ways. For example, the Dimroth reaction [Dimroth, Berichte, 71B, 1334 (1938)] applied to 17β-hydroxy-20-pregnene steroids produces 21-hydroxy, 21-acetoxy, or 21-bromo-17(20)-pregnene steroids which can be converted to other 21-acyloxy steroids according to methods known in the art [see Serini, British 213,630, Berichte, 71B, 1313, 1362 (1938), U. S. 2,267,258, 2,305,727, British 467,790, Miescher et al., Helv. Chim. Acta, 22, 120, 894 (1939), Ruzicka and Mueller, ibid., 22, 416, 755 (1939)]. Alternatively, these starting compounds can be produced by the methods disclosed hereinafter and in copending application Serial No. 307,385 of Hogg, Lincoln, and Beal, filed August 30, 1952.

Since it is ordinarily advantageous to separate the osmium from the steroidal reaction product, the reaction mixture is usually treated with an agent capable of removing the osmium, e. g., sodium sulfite, hydrogen sulfide, or the like, to precipitate the osmium as free osmium or as an insoluble salt of the added anion. The common procedure heretofore has been to heat the reaction mixture with aqueous sodium sulfite at elevated temperatures, e. g., the refluxing temperature of the mixture. Under these conditions, an acetate group in the reaction product is at least partially hydrolyzed and reacetylation is necessary to produce a completely acetylated reaction product.

When following the preferred conditions of the present invention, the reaction product is mixed with aqueous sodium sulfite at about room temperature or lower to remove the osmium from the reaction mixture. Under these conditions, an acetate or other readily hydrolyzable ester group in the molecule is maintained intact and the reesterification step necessary when following the procedure of the prior art is not needed. Enhanced yield of steroidal product is thereby obtained.

The use of low concentrations of osmium tetroxide in the reaction mixture, e. g., less than about 0.02 and preferably as low as 0.001 molar equivalent, calculated on the starting steroid, results in an insignificant loss in reaction product which may be tied up as an osmate ester at the end of the reaction, if the reaction mixture is not hydrolyzed. If the presence of osmium is not undesirable in the reaction mixture, the hydrolysis step may therefore be eliminated when employing the preferred low concentrations of osmium tetroxide in the reaction mixture, further enhancing the simplicity of the reaction. The extremely slow reaction obtained when performing the reaction of the prior art ordinarily prohibits the use of these low concentrations of osmium tetroxide. Since the supply of osmium tetroxide is somewhat limited and osmium tetroxide is toxic and dangerous, the use of these very low concentrations facilitates the adaption of the process to large scale reactions.

The following examples are illustrative of the process and products of the present invention but are not to be construed as limiting.

PREPARATION 1.—TRIETHYLAMINE OXIDE PEROXIDE

To 50.6 grams (0.5 mole) of vigorously stirred triethylamine cooled by a water bath was added dropwise 68 grams (1.0 mole) of fifty percent hydrogen peroxide at such a rate that the temperature of the reaction mixture stayed between 25 and thirty degrees centigrade. The addition required about fifteen minutes. The resulting mixture was stirred for four hours at thirty degrees centigrade and then distilled at a pressure of about fifteen millimeters or less, while the bath temperature was maintained at between forty and fifty degrees centigrade, until most of the water (about 43 milliliters of distillate) was removed. The distillation pressure was then reduced to about one millimeter, the bath temperature reduced to about 35 degrees centigrade and distillation then continued until crystallization occurred and volatilization of the residue ceased. The crystalline residue was suspended in 100 milliliters of cold acetone, filtered, and then washed with two 25-milliliter portions of acetone. The washed cake was dried at reduced pressure at thirty to fifty degrees centigrade and the resulting 59 grams of product was purified by dissolving in 300 milliliters of methylene chloride and then adding 450 milliliters of Skellysolve B hexane hydrocarbons with stirring to precipitate the amine oxide peroxide. The mixture was cooled at about five degrees centigrade for about three hours and then filtered. The cake was washed with fifty milliliters of cold acetone and then dried as before. The yield of pure triethylamine oxide peroxide was 57.1 grams, a yield of 75.7 percent of the theoretical.

PREPARATION 2.—N-METHYLMORPHOLINE OXIDE PEROXIDE

To a solution of 26 grams (0.25 mole) of N-methylmorpholine in 100 milliliters of tertiary butyl alcohol was added 34 grams (0.50 mole) of fifty percent hydrogen peroxide portionwise, with stirring and while maintaining the reaction temperature at between thirty and 35 degrees centigrade with a water bath. The resulting solution was then diluted to 170 milliliters with tertiary butyl alcohol, maintained at room temperature for 48 hours, and then dried with sixty grams of anhydrous magnesium sulfate for an additional 24 hours. The magnesium sulfate was removed by filtration and the filtrate was distilled to dryness to produce crystalline N-methylmorpholine peroxide. Alternatively, the solution can be titrated for available peroxide and the N-methylmopholine oxide peroxide used without isolation.

Following the procedure described in Preparations 1 and 2, other amine oxide peroxides e. g., trimethylamine oxide peroxide, N-methylpyrrolidine oxide peroxide, etc., are prepared by reacting the selected tertiary amine with two molar equivalents of hydrogen peroxide. Alternatively, an amine oxide peroxide may be prepared by reacting an anhydrous amine oxide with a tertiary butyl alcohol solution of a molar equivalent of anhydrous hydrogen peroxide. This latter technique is recommended with amines which are resistant to the formation of amine oxides, e. g., pyridine oxide, quinoline oxide, picoline oxide and other tertiary aromatic-N-heterocyclic amine oxides.

PREPARATION 3.—3,11-DIKETO-4,17(20)-PREGNADIENE-21-OIC ACID METHYL ESTER

To a mixture of 6.4 milliliters of methanolic sodium methoxide, 0.90 milliliter of absolute ethanol, and forty milliliters of dry benzene, which had previously been distilled until sixteen milliliters of distillate had been collected and the mixture then cooled, was added 4.6 milliliters of ethyl oxalate and a solution of 6.56 grams of 11-ketoprogesterone in 76 milliliters of dry benzene. The solution became turbid and a yellow precipitate formed. The reaction mixture was stirred for ninety minutes and 110 milliliters of ether was then added thereto and stirring was continued for sixty minutes followed by the addition of a 260-milliliter portion of ether. The thus-formed yellow precipitate of the sodium enolate of 21-ethoxyoxalyl-11-ketoprogesterone was filtered, washed with several fifty-milliliter portions of ether and after drying weighed 7.30 grams. The ether washings contained 1.08 grams of unreacted 11-ketoprogesterone. The yield of the sodium enolate of 21-ethoxyoxalyl-11-ketoprogesterone was 81 percent of the theoretical or practically quantitative calculated on the reacted 11-ketoprogesterone. The presence of a sodium enolate was verified by the extreme solubility of the product in water and by a positive ferric chloride test for enols as exhibited by the formation of a bright red color when the product was dissolved in alcoholic and aqueous ferric chloride solutions.

The sodium enolate of 11α-hydroxy-21-ethoxyoxalylprogesterone, the sodium enolate of 11β-hydroxy-21-ethoxyoxalylprogesterone, the sodium enolate of 11α-acetoxy-21-ethoxyoxalylprogesterone, and the sodium enolate of 21-ethoxyoxalylprogesterone, respectively, are prepared by substituting 11α-hydroxyprogesterone, 11β-hydroxyprogesterone, 11α-acetoxyprogesterone, and progesterone, respectively, for the 11-ketoprogesterone as starting steroid in the above-described reaction.

To a stirred solution of 4.50 grams (0.01 mole) of the sodium enolate of 11-keto-21-ethoxyoxalylprogesterone and two grams of potassium acetate in 150 milliliters of methanol was added dropwise 3.09 grams (1.00 ml.; 0.0193 mole) of bromine. When the addition was complete, 3.24 grams (0.06 mole) of sodium methoxide in forty milliliters of methanol was added thereto, whereafter the whole was maintained at about 25 degrees centigrade for sixteen hours. The reaction mixture was then mixed with a large volume of water and the whole was extracted successively with one portion of benzene and two portions of methylene chloride. The combined extracts were dried over anhydrous sodium sulfate and the solvent was then removed therefrom by distillation. The residue was dissolved in 100 milliliters of methylene chloride and chromatographed over and eluted from 150 grams of Florisil synthetic magnesium silicate with methylene chloride containing increasing amounts of acetone. The methylene chloride plus five percent acetone eluates contained 1.2 grams of 3,11-diketo-4,17(20)-pregnadiene- 21-oic acid methyl ester, melting at 155 to 188 degrees centigrade. Crystallization of these crystals from a mixture of acetone plus Skellysolve B hexane hydrocarbons gave crystals melting at 207 to 212 degrees centigrade.

Similarly, substituting the sodium enolate of 11α-hydroxy-21-ethoxyoxalylprogesterone for the sodium enolate of 11-keto-21-ethoxyoxalylprogesterone used in the reaction described above is productive of methyl 3-keto-11α-hydroxy-4,17(20)-pregnadiene-21-oate. The sodium enolate of 21-ethoxyoxalylprogesterone is similarly converted to methyl 3-keto-4,17(20)-pregnadiene-21-oate.

PREPARATION 4.—3-ETHYLENE GYYCOL KETAL OF 3,11-DIKETO-4,17(20)-PREGNADIENE-21-OIC ACID METHYL ESTER

To a solution of 1.5 grams (0.0042 mole) of 3,11-diketo-4,17(20)-pregnadiene-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadiene-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17(20)-pregnadiene-21-oic acid methyl ester. The yield of product was 87 percent of the theoretical calculated on the amount of starting steroid which reacted.

*Analysis.*—Calculated for $C_{24}H_{32}O_5$: C, 71.94; H, 8.05. Found: C, 71.90; H, 7.95.

Substituting methyl 3-keto-11α-hydroxy-4,17(20)-pregnadiene-21-oate for the methyl 3,11-diketo-4,17(20)-pregnadiene-21-oate as starting steroid in the reaction described above is productive of the 3-ethylene glycol ketal of methyl 3-keto-11α-hydroxy-4,17(20)-pregnadiene-21-oate. Methyl 3-keto-4,17(20)-pregnadiene-21-oate is similarly converted to the 3-ethylene glycol ketal of methyl 3-keto-4,17(20)-pregnadiene-21-oate.

PREPARATION 5.—3-ETHYLENE GLYCOL KETAL OF 11β,21-DIHYDROXY-4,17(20)-PREGNADIENE-3-ONE

A solution of 1.50 grams of the 3-ethylene glycol ketal of 3,11-diketo-4,17(20)-pregnadiene-21-oic acid methyl ester in seventy milliliters of benzene was added dropwise to a stirred mixture of 1.50 grams of lithium aluminum hydride and fifty milliliters of anhydrous ether. When addition was complete, the reaction mixture was refluxed for one-half hour whereafter the mixture was cooled to room temperature. Fifty milliliters of water was then cautiously added to the stirred reaction mixture to decompose the excess lithium aluminum hydride, followed by 200 milliliters of methylene chloride. The whole was then centrifuged to facilitate separation of the organic and aqueous phases. The organic phase was separated, the solvent distilled and the white crystalline distillation residue was crystallized from a mixture of ethyl acetate and Skellysolve B hexane hydrocarbons to yield 1.003 grams, a yield of 72 percent of the theoretical, of crystalline 3-ethylene glycol ketal of 11β,21-di-hydroxy-4,17(20)-pregnadiene-3-one in two crops. The first crop, the analysis of which is given below, melted at 191 to 194 degrees centigrade and the second, at 172 to 180 degrees centigrade.

*Analysis.*—Calculated for $C_{23}H_{34}O_4$: C, 73.76; H, 9.15. Found: C, 73.87; H, 9.22.

Substituting the 3-ethylene glycol ketal of methyl 3-keto-11α-hydroxy-4,17(20)-pregnadiene-21-oate as the starting steroid in the above-described reaction is productive of the 3-ethylene glycol ketal of 11α,21-dihydroxy-4,17(20)-pregnadiene-3-one. The 3-ethylene glycol ketal of methyl 3-keto-4,17(20)-pregnadiene-21-oate is similarly converted to the 3-ethylene glycol ketal of 21-hydroxy-4,17(20)-pregnadiene-3-one.

PREPARATION 6.—11β,21-DIHYDROXY-4,17(20)-PREGNADIENE-3-ONE

A solution of 0.572 gram (0.0015) mole) of the 3-ethylene glycol ketal of 11β,21-dihydroxy-4,17(20)-pregnadiene-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water were then added, the methylene chloride layer removed, and the solvent distilled therefrom. The residue, after drying in vacuo, consisted of the theoretical 0.518 gram of 11β,21-dihydroxy-4,17(20)-pregnadiene-3-one.

Substituting the 3-ethylene glycol ketal of 11α,21-dihydroxy-4,17(20)-pregnadiene-3-one as the starting hydroxy-4,17(20)-pregnadiene-3-one as the starting steroid in the above-described reaction is productive of 11α,21-dihydroxy-4,17(20)-pregnadiene-3-one. The 3-ethylene glycol ketal of 21-hydroxy-4,17(20)-pregnadiene-3-one is similarly hydrolyzed to 21-hydroxy-4,17(20)-pregnadiene-3-one.

PREPARATION 7.—11β-HYDROXY-21-ACETOXY-4,17(20)-PREGNADIENE-3-ONE

A solution of 0.518 gram of 11β,21-dihydroxy-4,17(20)-pregnadiene-3-one in five milliliters of pyridine was mixed with two milliliters of acetic anhydride and the whole was then maintained at room temperature for seventeen hours whereafter crushed ice was added thereto. The precipitated 11β-hydroxy-21-acetoxy-4,17(20)-pregnadiene-3-one was filtered therefrom, dissolved in benzene and then chromatographed over a column of 75 grams of Florisil synthetic magnesium silicate. The column was developed with 75-milliliter portions of solvents of the following composition and order: benzene, three portions each of Skellysolve B hexane hydrocarbons plus one percent acetone, Skellysolve B plus five percent acetone, Skellysolve B plus ten percent acetone, Skellysolve B plus fifteen percent acetone, Skellysolve B plus twenty percent acetone, and finally, two portions of acetone. The eluate fractions containing ten percent and fifteen percent acetone, respectively, were combined, the solvent removed therefrom, and the crystalline residue was crystallized from a mixture of ethyl acetate and Skellysolve B to yield as the first crop 0.253 gram, a yield of 45 percent of the theoretical, of 11β-hydroxy-21-acetoxy-4,17(20)-pregnadiene-3-one melting at 183 to 186 degrees centigrade.

*Analysis.*—Calculated for $C_{23}H_{32}O_4$: C, 74.16; H, 8.66. Found: C, 74.18; H, 8.45; C, 73.95; H, 8.74.

Similarly, esterifying 21-hydroxy-4,17(20)-pregnadiene-3-one in the manner described above with acetic anhydride is productive of 21-acetoxy-4,17(20)-pregnadiene-3-one. 11α-hydroxy-21-acetoxy-4,17(20)-pregnadiene-3-one and 11α,21-diacetoxy-4,17(20)-pregnadiene-3-one, respectively, are similarly prepared by reacting about a molar equivalent and a large molar excess of acetic anhydride, respectively, in the manner described above with 11α,21-dihydroxy-4,17(20)-pregnadiene-3-one.

Other esters of 11α,21-dihydroxy-4,17(20)-pregnadiene-3-one, 11β,21 - dihydroxy-4,17(20)-pregnadiene-3-one and 21-hydroxy-4,17(20)-pregnadiene-3-one are prepared by substituting other acid anhydrides or acid chlorides in the reaction described above, e. g., propionic anhydride, benzoyl chloride, phthalic anhydride, succinic anhydride, oxalyl chloride, trimethylacetyl chloride, cyclopentylpropionyl chloride, diethylacetyl chloride, phenylpropionyl chloride, and the like. The formate esters are ordinarily prepared using about 98 percent formic acid and an esterification catalyst. Esters of 21-hydroxy-4,17(20)-pregnadiene-3,11-dione are prepared by the oxidation of the corresponding ester of 11β,21-dihydroxy-4,17(20)-pregnadiene-3-one with chromic acid under mild conditions.

*Example 1.—11β,17α-dihydroxy-21-acetoxy-4-pregnene-3,20-dione*

A. WITH TRIETHYLAMINE OXIDE PEROXIDE

A solution of 372 milligrams (1.0 millimole) of 11β-hydroxy-21-acetoxy-4,17(20)-pregnadiene-3-one in twenty milliliters of warm sodium dried tertiary butyl alcohol of 0.04 percent moisture content was cooled to 25 degrees centigrade and 12.5 milligrams (0.05 millimole) of osium tetroxide and 0.5 milliliter of pyridine were then added thereto. The resulting mixture was stirred for 45 minutes and 385 milligrams (2.5 millimoles) of triethylamine oxide peroxide was then added over a period of one hour. The solution was stirred for an additional twenty minutes and 100 milligrams of sodium sulfite in twenty milliliters of water was then added thereto. The resulting mixture was concentrated to a volume of about ten to fifteen milliliters by distillation at reduced pressure and then extracted thoroughly with methylene chloride. The extraction solution was dried over sodium sulfate and chromatographed over forty grams of Florisil synthetic magnesium silicate. The column was developed with 200-milliliter fractions of ethylene chloride containing increasing amounts of acetone. The eluate fractions containing 2.5 percent acetone contained starting material, the seven percent acetone fractions contained the hydrocortisone acetate and the fifteen percent acetone fraction contained 11β,17α,20-trihydroxy-21-acetoxy-4-pregnene-3-one. There was thus-obtained 34 milligrams (nine percent) of starting material, 54 milligrams (thirteen percent) of 11β,17α,20-trihydroxy-21-acetoxy-4-pregnene-3-one, and 294 milligrams (73 percent) of 11β,17α - dihydroxy - 21 - acetoxy - 4 - pregnene - 3,20-dione (hydrocortisone acetate).

In similar reactions, essentially the same yield of hydrocortisone acetate was obtained when the amine oxide peroxide was added over a period of thirty minutes or when added all at once.

In other reactions, the amount of osmium tetroxide was reduced to six milligrams (0.02 millimole; 2.5 mole percent) per millimole of steroid without a reduction in yield of hydrocortisone acetate.

A further experiment, under exactly the same conditions as described in Example 1 except that only three milligrams (0.01 millimole; 1.3 mole percent) of osmium tetroxide per millimole of steroid was employed, gave a 70.5 percent yield of hydrocortisone acetate and an 11.5 percent yield of 11β,17α,20-trihydroxy-21-acetoxy-4-pregnene-3-one.

Following the procedure described in Example 1A, other esters of hydrocortisone, e. g., the formate, propionate, butyrate, dimethylacetate, valerate, trimethylacetate, hexanoate, heptanoate, octanoate, β-cyclopentylpropionate, phenylacetate, phenylpropionate, diethylacetate, acid succinate, benzoate, 2,6-dimethylbenzoate, or the like, are prepared by substituting the corresponding 21-mono ester of 11β,21-dihydroxy-4,17(20)-pregnadiene-3-one as the starting steriod in the reaction described in Example 1.

B. WITH N-METHYLMORPHOLINE OXIDE PEROXIDE

To a solution of 11.4 grams (0.112 mole) of N-methylmorpholine in 95 milliliters of t-butyl alcohol was added 6.2 milliliters (0.225 mole) of ninety percent hydrogen peroxide. After stirring for nineteen hours, the mixture was dried with 25 grams of calcium sulfate for one hour and then filtered. The resulting solution titrated 1.46 N for N-methylmorpholine oxide peroxide.

To a solution of 5.58 grams (fifteen millimoles) of 11β-hydroxy-21-acetoxy-4,17(20)-pregnadiene-3 - one in 275 milliliters of sodium-dried tertiary butyl alcohol was added 7.5 milliliters of pyridine and 92 milligrams (0.36 millimole) of osmium tetroxide. The solution was stirred for thirty minutes and 25.7 milliliters (37.5 millimoles) of the above-described solution of N-methylmorpholine oxide peroxide was added rapidly thereto. The mixture was stirred for one hour and one half of the tertiary butyl alcohol was then distilled therefrom at reduced pressure. To the distillation residue was added 125 milliliters of a five percent aqueous solution of sodium sulfite and the resulting suspension of crystals was stirred for one hour, followed by the addition of another 200 milliliters of water. The suspension was refrigerated overnight and the resulting precipitate was filtered, washed with a 1:4 mixture of tertiary butyl alcohol and water, and then water alone, and the washed crystals were dried in a vacuum oven at sixty degrees centigrade yielding 4.49 grams, a yield of 74.2 percent of the theoretical, of 11β,17α - dihydroxy - 21 - acetoxy-4-pregnene-3,20-dione melting at 208 to 212.5 degrees centigrade. Crystallization of these crystals from ethyl acetate gave 4.12 grams of hydrocortisone acetate melting at 215 to 218.5 degrees centigrade. The aqueous filtrates contained 8.5 percent starting steroid, 5.8 percent of 11β,17α,20-trihydroxy-21-acetoxy-4-pregnene-3-one, and two percent of hydrocortisone acetate.

Similar reactions, employing 0.3 milligram (0.001 millimole) of osmium tetroxide per millimole of starting steroid and a reaction time of about eight hours resulted in about a 66 percent yield of hydrocortisone acetate.

Other experiments, employing quinoline or collidine as the amine catalyst, gave similar results as when pyridine was used. Other experiments, without an amine catalyst, gave similar yields of desired 17α-hydroxy-20-keto-21-acyloxy steroid when the reaction was carried to completion.

*Example 2.—17α-hydroxy-21-acetoxy-4-pregnene-3,11,20-trione*

Following the procedure described in Example 1A, 21-acetoxy-4,17(20)-pregnadiene-3,11-dione was converted by the action of 0.02 molar equivalent of osmium tetroxide and 2.5 molar equivalents of triethylamine oxide peroxide in more than fifty percent yield into 17α-hydroxy-21-acetoxy-4-pregnene-3,11,20-trione (cortisone acetate).

*Example 3.—3α,21-diacetoxy-17α-hydroxypregnane-20-one*

Following the procedure described in Example 1B, 3α,21-diacetoxy-17(20)-pregnene was converted by the action of 0.02 molar equivalent of osmium tetroxide and 2.2 molar equivalents of N-methyl morpholine oxide peroxide into 3α,21-diacetoxy-17α-hydroxypregnane-20-one in tertiary butyl alcohol containing about three milliliters of pyridine per millimole of steroid.

*Example 4.—17α-hydroxy-21-acetoxy-4-pregnene-3,20-dione*

Following the procedure described in Example 1B, 21-acetoxy-4,17(20)-pregnadiene-3-one is converted by the action of 0.002 molar equivalents of osmium tetroxide and 2.5 molar equivalents of N-methylmorpholine oxide peroxide, into 17α-hydroxy-21-acetoxy-4-pregnene-3,20-dione.

*Example 5.—11α,17α-dihydroxy-21-acetoxy-4-pregnene-3,20-dione*

Following the procedure described in Example 1B, 11 α-hydroxy-21-acetoxy-4,17(20)-pregnadiene-3-one is converted by the action of 0.05 molar equivalents of osmium tetroxide and 2.2 molar equivalents of N-methylmorpholine oxide peroxide into 11α,17α-dihydroxy-21-acetoxy-4-pregnene-3,20-dione.

In exactly the same manner, 3β,21-diacetoxy-17(20)-allopregnene was converted into 3β,21-diacetoxy-17α-hydroxyallo-pregnane-20-one by the action of 0.02 molar equivalent of osmium tetroxide and 2.2 molar equivalents of triethylamine oxide peroxide.

Similarly, the following compounds are converted into the corresponding 17α-hydroxy-20-keto steroids by the action of about the same equivalent amounts as described above of osmium tetroxide and an amine oxide peroxide: 21 - (β - cyclopentylpropionyloxy)-17(20)-pregnene-3,11-dione, 21-acetoxy-4,9(11),17(20)-pregnatriene-3-one, 21-acetoxy-4,17(20)-pregnadiene-3-one, 3α-hydroxy-21-acetoxy-17(20)-pregnene, 21-acetoxy-9-chloro-11β-hydroxy-4,17(20)-pregnadiene - 3 - one, 3-hydroxy-21-acetoxy-19-normethyl - 1,3,5(10),17(20)-pregnatetraene, 3,21-diacetoxy-19-normethyl-1,3,5(10),17(20)-pregnatetraene and others.

It is to be understood that this invention is not to be limited to the exact details of operation and exact compounds shown and described, as obvious modifications and equivalents will be apparent to one skilled in the art and the invention is therefore to be limited only by the scope of the appended claims.

We claim:

1. A process for the production of a 17-hydroxy-20-keto-21-acyloxy steroid of the pregnane series which comprises oxygenating a $\Delta^{17(20)}$-21-acyloxy steroid of the pregnane series having a 20-hydrogen atom with osmium tetroxide and a tertiary amine oxide peroxide to produce the corresponding 17-hydroxy-20-keto-21-acyloxy steroid.

2. The process of claim 1 wherein between about two and about 2.75 molar equivalents of amine oxide peroxide and less than about 0.05 molar equivalent of osmium tetroxide, calculated on the starting steroid, are employed.

3. The process of claim 1 wherein the amine oxide peroxide is non-aromatic.

4. The process of claim 1 wherein the amine oxide peroxide is triethylamine oxide peroxide.

5. The process of claim 1 wherein the amine oxide peroxide is N-methylmorpholine oxide peroxide.

6. A process for the production of a 17α-hydroxy-20-keto-21-acyloxy steroid which comprises oxygenating a steroid represented by the following formula:

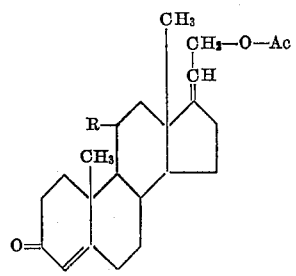

wherein R is an 11-position substituent selected from the group consisting of hydrogen, an α-hydroxy group, a β-hydroxy group, an α-acyloxy group, and ketonic oxygen, and wherein Ac is the acyl radical of an organic carboxylic acid, with at least about two molar equivalents of a tertiary amine oxide peroxide and less than 0.05 molar equivalents of osmium tetroxide, calculated on the starting steroid, to produce the corresponding 17α-hydroxy-20-keto-21-acyloxy steroid.

7. The process of claim 6 wherein the amine oxide peroxide is non-aromatic.

8. The process of claim 6 wherein R is β-hydroxy and less than about 0.02 molar equivalent of osmium tetroxide is employed.

9. The process of claim 6 wherein R is α-hydroxy and less than about 0.02 molar equivalent of osmium tetroxide is employed.

10. The process of claim 6 wherein R is ketonic oxygen and less than about 0.02 molar equivalent of osmium tetroxide is employed.

11. The process of claim 6 wherein R is hydrogen and less than about 0.02 molar equivalent of osmium tetroxide is employed.

12. The process which comprises oxygenating 11α-hydroxy-21-acetoxy-4,17(20)-pregnadiene-3-one with less than about 0.02 molar equivalent of osmium tetroxide and between about two and about 2.75 molar equivalents of a tertiary amine oxide peroxide, calculated on the starting steroid, to produce 11α,17α-dihydroxy-21-acetoxy-4-pregnene-3,20-dione.

13. The process which comprises oxygenating 21-acetoxy-4,17(20)-pregnadiene-3,11-dione with less than about 0.02 molar equivalent of osmium tetroxide and between about two and about 2.75 molar equivalents of a tertiary amine oxide peroxide, calculated on the starting steroid, to produce 17α-hydroxy-21-acetoxy-4-pregnene-3,11,20-trione.

14. The process which comprises oxygenating 21-acetoxy-4,17(20)-pregnadiene-3-one with less than about 0.02 molar equivalent of osmium tetroxide and between about two and about 2.75 molar equivalents of a tertiary amine oxide peroxide, calculated on the starting steroid, to produce 17α - hydroxy - 21 - acetoxy-4-pregnene-3,20-dione.

15. The process which comprises oxygenating 11β-hydroxy-21-acetoxy-4,17(20)-pregnadiene-3-one with less than about 0.02 molar equivalent of osmium tetroxide and between about two and about 2.75 molar equivalents of a tertiary amine oxide peroxide, calculated on the starting steroid, to produce 11β,17α-dihydroxy-21-acetoxy-4-pregnene-3,20-dione.

16. The process of claim 15 wherein the amine oxide peroxide is non-aromatic.

17. The process of claim 15 wherein the amine peroxide is triethylamine oxide peroxide.

18. The process of claim 15 wherein the amine peroxide is N-methylmorpholine oxide peroxide.

19. The process of claim 15 wherein less than about 0.002 molar equivalent of osmium tetroxide is employed and a reaction temperature above about twenty degrees centigrade is employed.

20. The process which comprises reacting 11β-hydroxy-21-acetoxy-4,17(20)-pregnadiene-3-one with less than about 0.002 molar equivalent of osmium tetroxide, and between about 2.2 and about 2.75 molar equivalents of N-methylmorpholine oxide peroxide calculated on the starting steroid in tertiary butyl alcohol containing pyridine, at a temperature above about twenty degrees centigrade, separating the osmium from the reaction product at a temperature below about thirty degrees centrigrade and then isolating 11β,17α-dihydroxy-21-acetoxy-4-pregnene-3,20-dione from the reaction product.

References Cited in the file of this patent

UNITED STATES PATENTS

| | | |
|---|---|---|
| 2,541,106 | Sarett | Feb. 13, 1951 |
| 2,610,907 | Stein | Sept. 16, 1952 |